United States Patent
Abe et al.

(10) Patent No.: US 6,864,656 B2
(45) Date of Patent: *Mar. 8, 2005

(54) MAGNETIC DISK DRIVE AND VOICE COIL MOTOR DRIVE CIRCUIT

(75) Inventors: Jiro Abe, Sagamihara (JP); Yosuke Hamada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/633,720

(22) Filed: Aug. 5, 2003

(65) Prior Publication Data

US 2004/0027088 A1 Feb. 12, 2004

Related U.S. Application Data

(63) Continuation of application No. 09/953,903, filed on Sep. 18, 2001, now Pat. No. 6,611,118.

(30) Foreign Application Priority Data

Sep. 18, 2000 (JP) ........................................ 2000-286874

(51) Int. Cl.[7] .............................................. H02P 5/40
(52) U.S. Cl. ...................... 318/560; 318/254; 318/439; 360/77.02; 360/77.13
(58) Field of Search ................................ 318/560, 561, 318/650, 603, 254, 139, 138, 432, 439; 360/60, 69, 75

(56) References Cited

U.S. PATENT DOCUMENTS

| 5,384,676 | A | * | 1/1995 | Yokoyama et al. ....... 360/77.13 |
| 5,963,393 | A | | 10/1999 | Rowan et al. |
| 6,344,721 | B2 | | 2/2002 | Seki et al. |
| 6,363,214 | B1 | * | 3/2002 | Merello et al. ............. 318/109 |
| 2002/0071199 | A1 | * | 6/2002 | Kokami et al. .......... 360/77.02 |

FOREIGN PATENT DOCUMENTS

JP 11-025625 1/1999

* cited by examiner

*Primary Examiner*—Paul Ip
(74) *Attorney, Agent, or Firm*—Antonelli, Terry, Stout & Kraus, LLP

(57) ABSTRACT

A magnetic disk drive that drives and positions an actuator using a voice coil motor, includes a current sensing resistor connected in series to a terminal on current input side of the voice coil motor, a first operational amplifier and a second operational amplifier. The magnetic disk drive further includes one of a third operational amplifier and a microcomputer.

5 Claims, 7 Drawing Sheets

MAGNETIC DISK DRIVE AND VOICE COIL MOTOR DRIVE CIRCUIT

CROSS REFERENCE TO RELATED APPLICATION

This is a continuation of U.S. application Ser. No. 09/953,903, filed Sep. 18, 2001, now U.S. Pat. No. 6,611,118, the subject matter of which is incorporated by reference herein.

BACKGROUND OF THE INVENTION

The present invention relates to a magnetic disk drive that implements positioning of a magnetic head using a voice coil motor (abbreviated to VCM hereinafter), and to a speed control method using the back electromotive force of a VCM.

As disclosed in JP-A 11-25625, a VCM back electromotive force sensor is used for speed control during loading and unloading of the magnetic head in a magnetic disk drive system that has a mechanism that moves the magnetic head into an evacuation area on the disk surface when it is not operating, and this is called a load-unload system.

In a well-known method of detecting back electromotive force, a voltage that is proportional to the VCM drive current is subtracted from the VCM coil terminal voltage, as shown in FIG. 2. In this figure, the VCM coil 1 can be modeled, as shown in the diagram, as a series connection of three elements: resistor 4 of resistance value Rm; an inductance 5 of inductance value Lm; and a back electromotive force 6 that should be detected with those. The VCM coil 1 is connected in series with a current sensing resistor 3 to a driver circuit, not shown, and the current 2 is controlled by the driver circuit. In such a circuit, the resistance R1 of resistor 27 and the resistance R2 of resistor 28, which are connected to the operational amplifier 26, take on values that satisfy the relationship Rm=R2/R1×Rs. When the ratio between resistance R3 and resistance R4 of resistors 30 through 33 connected to operational amplifier 29 is G=R4/R3, the detected back electromotive force signal Bemf_h can be expressed by the following equation:

$$\text{Bemf\_h} = G \cdot (\text{Bemf} + sL_m \cdot Im) + V\text{ref} \qquad \text{(Equation 1)}$$

The principle of measurement according to Equation 1, which is associated with conventional back electromotive force sensors, will be explained in further detail using the block diagram shown in FIG. 9. As explained above, the VCM coil can be modeled by connecting, in series, resistor Rm, inductance Lm and the back electromotive force Bemf, that should be detected. The impedance Z of this VCM coil can be expressed as Rm sLm. Here, s is a differential operator. Block 112 shows the coefficient for conversion from [VCM coil terminal voltage Vs] to [VCM coil current Im], that is, the inverse of the VCM coil impedance. Reference numeral 104 denotes the VCM coil current Im. This current Im can be expressed by multiplying the inverse of the VCM coil impedance and the differential voltage 103 between the VCM terminal voltage Vs 101 and the back electromotive force Bemf 102 produced by movement of the actuator.

Back electromotive force sensors that use conventional technology calculate the voltage drop Vrm 105, caused by VCM coil resistance Rm, from the VCM coil current Im 104. They then determine the back electromotive force signal Bemf_h 106 by subtracting this voltage drop from the VCM terminal voltage 101. In FIG. 9, block 113 represents the coefficient for conversion from [VCM coil current Im] to [current drop Vrm caused by VCM coil resistance], that is the VCM coil resistance Rm.

The following Equation 2 is derived from the above-described theoretical flow.

$$\text{Bemf\_h} = V_s - R_m \cdot I_m = [\text{Bemf} + (R_m + sL_m) \cdot I_m] - R_m \cdot I_m = \text{Bemf} + sL_m \cdot I_m \qquad \text{(Equation 2)}$$

Equation 1 above is obtained when this theoretical equation is made to correspond to the circuit of the conventional back electromotive force sensor shown in FIG. 2.

Thus, the value of the back electromotive force detected in conventional circuits includes an item that is proportional to the VCM coil current Im differential. In other words, the second item sLm·Im in the parentheses on the right side of Equation 1 includes the differential operator s, which indicates a Laplace transformation. This item is proportional to the VCM coil current Im differential. Accordingly, when the VCM coil current Im changes and directly after it changes, the transient response caused by this differential item means that the correct back electromotive force cannot be detected. Therefore, in a load-unload control system that uses this back electromotive force sensor, the transient response caused by this differential item is set by using a sufficiently large control sample period (for example 700 micro seconds ($\mu$s)), thus eliminating this effect.

SUMMARY OF THE INVENTION

However, restrictions on the control sample period in conventional back electromotive force sensors narrow the range of use for back electromotive force signals. Back electromotive force is proportional to speed. Therefore, when the signal quality is good, that is if a back electromotive force can be detected without any problem associated with the transient response caused by the differential item and without being affected by fast changes in current in a fast control sample period, then that back electromotive force can be applied in various types of control in systems other than the above-described load-unload system. Therefore, it is valuable. Other uses include the detection of abnormal operation in magnetic head positioning control systems that use back electromotive force monitoring during normal operation, and brake control in which back electromotive force is used when detecting abnormal operation.

However, the control sample periods in magnetic disk drives of recent years are 200 microseconds ($\mu$s) at the fastest, and can go as low as 100 microseconds ($\mu$s) or below. Therefore, conventional back electromotive force sensors with a sampling period of approximately 700 $\mu$s could not be used as a speed signal during normal positioning operations.

With the foregoing in view, it is an object of the present invention to provide a back electromotive force sensor that can detect high quality back electromotive force signals, that is back electromotive force signals that can be detected without any problem associated with the transient response caused by the above differential item and without affecting fast changes in current in a fast control sample period.

To fulfill the foregoing object, the present invention provides a positioning device for driving and positioning an actuator using a VCM, with the following means for detecting the back electromotive force produced in the VCM coil: a first circuit that detects the terminal voltage of a VCM coil and outputs a band-limited signal that is a constant multiple of that value; a second circuit that detects the drive current for the voice coil motor and that outputs a voltage signal that is proportional to the above drive current; and a computation circuit that determines the difference between the output of the above first circuit and the output of the above second circuit. The first circuit has the effect of eliminating the item that is proportional to the VCM coil current differential, which was problematic in conventional methods.

Also, the present invention is configured so that the first circuit is a primary analog low pass filter with a time constant that is substantially equal to the ratio between the inductance and resistance of the VCM coil. This configuration simplifies detection and calculation of back electromotive force.

The band limiting is achieved in the first circuit by a primary digital low pass filter that is configured so that its time constant is substantially equal to the ratio between the inductance and resistance of the VCM coil. This configuration simplifies detection and calculation of back electromotive force.

In the low pass filter, the resistor that prescribes the filter gain and the capacitor that prescribes the filter time constant are located outside the IC chip. The second circuit and the computation circuit are provided as coefficient amplifiers in which operational amplifiers are used. The resistor that prescribes the gain of these coefficient amplifiers is located outside the IC chip. This configuration enables great scope for adjustment of filter and coefficient amplifier gain and for adjustment of the time constants for the above filters.

The magnetic disk drive that uses a VCM to drive an actuator with a magnetic head and that positions the head on the disk comprises: a first circuit that detects the terminal voltage of the VCM coil and outputs a band-limited signal that is a constant multiple of that value; a second circuit that detects the drive current of the voice coil motor and outputs a voltage signal that is proportional to the drive current; and a back electromotive force sensor that detects the back electromotive force in the VCM coil and consists of a computation that determines the difference between the output of the first circuit and the output of the second circuit. The actuator is provided with a speed control function from a feedback control system that uses the back electromotive force detected by the back electromotive force sensor. The sensor described above is used as a back electromotive force sensor. This configuration enables speed control of a magnetic head in a magnetic disk drive.

A VCM drive circuit that includes the present invention can be used to configure a back electromotive force sensor without the need for external operational amplifier circuits.

DESCRIPTION OF THE PREFERRED EMBODIMENTS

Various embodiments of the present invention will be explained below with reference to the drawings.

Figure 1:
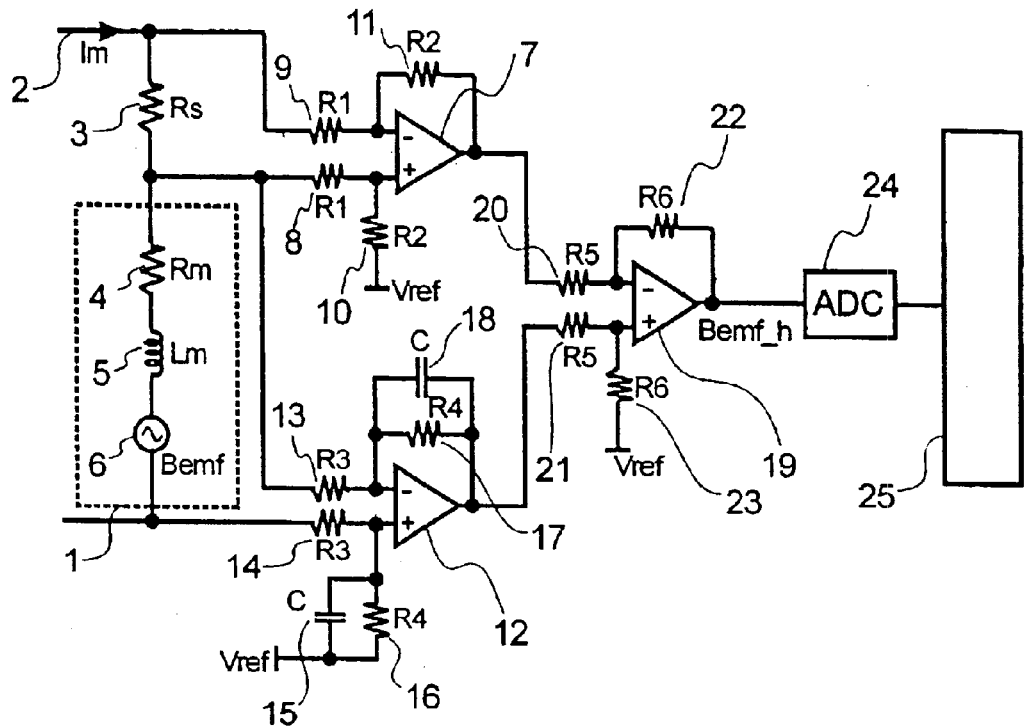
FIG. 1 is a schematic circuit diagram of a first embodiment of a back electromotive force sensor according to the present invention.

FIG. 1 shows a first embodiment of a back electromotive force sensor according to the present invention. As shown in the drawing, the VCM coil 1 can be modeled as a series connection of three elements: resistor 4 of resistance Rm; inductor 5 of inductance Lm; and the back electromotive force 6, which should be detected with them. The VCM coil 1 is connected in series with a current sensing resistor 3 to a driver circuit that is not shown. The current 2 is controlled by this driver circuit.

Low pass filters, each comprising an operational amplifier 12, resistors 13, 14, 16, and 17, and capacitors 15 and 18, are connected across both ends of the VCM coil 2. These low pass filters are an example of a first circuit means in accordance with the present invention. These low pass filters are primary low pass filters, wherein the gain $AI=R4/R3$ and the filter time constant $Tm=C \times R4$. Gain AI is selected so that the output value for the operational amplifier 12 is not saturated even when the maximum voltage that can be applied to the VCM coil 2 is applied. Also, C and R4 are selected for the filter time constant Tm so that $Tm=Lm/Rm$.

Coefficient amplifiers, each comprising an operational amplifier 7 and resistors 8, 9, 10, and 11, are connected across both ends of a current sensing resistor 3. These coefficient amplifiers are an example of a second circuit means in accordance with the present invention. The gain A2 for these coefficient amplifiers is equal to $R2/R3$. The resistances R2 and R3 are selected so that $A2=A1 \times Rm/Rs$. The outputs of operational amplifiers 7 and 12 are connected to a subtraction amplifier circuit comprising an operational amplifier 19 and resistors 20, 21, 22, and 23. This subtraction amplifier is an example of the computation means in accordance with the present invention.

The subtraction amplifier output Bemf_h is shifted towards the center of the input range of the AD converter 24 by the reference voltage Vref. The gain A3 for the subtraction amplifier is selected in a dynamic range of the back electromotive force 6 so that $G \times Bemf + Vref$ is within the input range of the AD converter 24. The above-described circuit configuration enables the output Bemf_h of the operational amplifier 19 to be expressed as follows (Equation 3):

$$\text{Bemf\_h} = \frac{G}{1+T_m s} \cdot Bemf + V_{ref} \qquad \text{Equation (3)}$$

From Equation 3, it can be seen that the output signal Bemf_h of the operational amplifier 19 is a signal obtained by multiplying back electromotive force 6 by a gain G, and it is band limited by a primary delay element for the time constant Tm. When Equation 3, which expresses the output signal for the present invention, is compared with Equation 1, which expresses the output signal for a conventional back electromotive force sensor, it can be seen that Equation 3 contains no error factor that is proportional to the differential item in the current. It expresses an ideal back electromotive force signal in which noise has been reduced because of band limiting, thus allowing fast sample detection. The output signal Bemf_h for the operational amplifier 19 is encrypted by an AD converter 24, incorporated into a microcomputer 25, and is used in VCM speed control.

Here, a detailed explanation of the flow derived from Equation 3 in accordance with the present invention will be given. A conventional back electromotive force sensor includes a differential item for the VCM coil current. The cause of the defect as described above in fast sampling is that conventional sensors ignore VCM coil inductance when estimating voltage drops caused by the VCM coil current.

Figure 9:
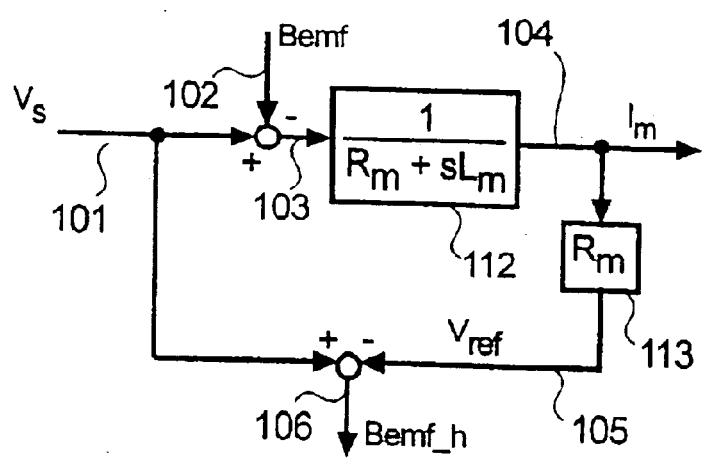
FIG. 9 is a block diagram showing measurement principles for conventional back electromotive force sensors.
Figure 10:
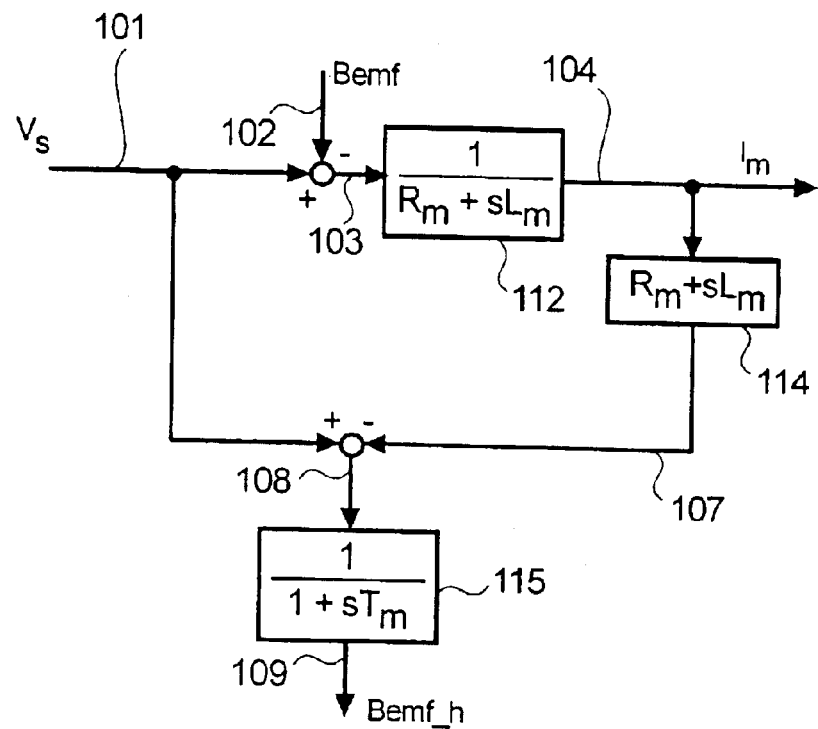
FIG. 10 is a block diagram showing the measurement principles involved in measurements made by a back electromotive force sensor when calculating drops in voltage caused by a VCM coil current and also taking VCM coil inductance into consideration.

FIG. 10 is a block diagram of a back electromotive force sensor that takes into consideration the inductance of a VCM coil when estimating voltage drops caused by the VCM coil current. In FIG. 10, parts that also appear in FIG. 9 have been identified using the same symbols. In this sensor, instead of the resistor Rm of block 113 of FIG. 9, a VCM coil impedance Rm+sLm has been used as block 114. Block 114 has the reverse characteristics of block 112 and so signals 103 and 107 are clearly the same, as are signals 108 and 102. Here, signal 102 is the back electromotive force Bemf.

The detected noise for signal 108 is cut by the primary low pass filter (time constant Tm) of block 115, and a back electromotive force signal 109 is obtained. The above flow enables the detected back electromotive force Bemf_h to be expressed as in Equation 4.

$$\text{Bemf\_h} = \frac{1}{1+ST_m} \cdot Bemf \qquad \text{Equation (4)}$$

However, the configuration shown in FIG. 10 is, in actual fact, difficult to achieve as it includes a differential element in block 114.

Figure 11:
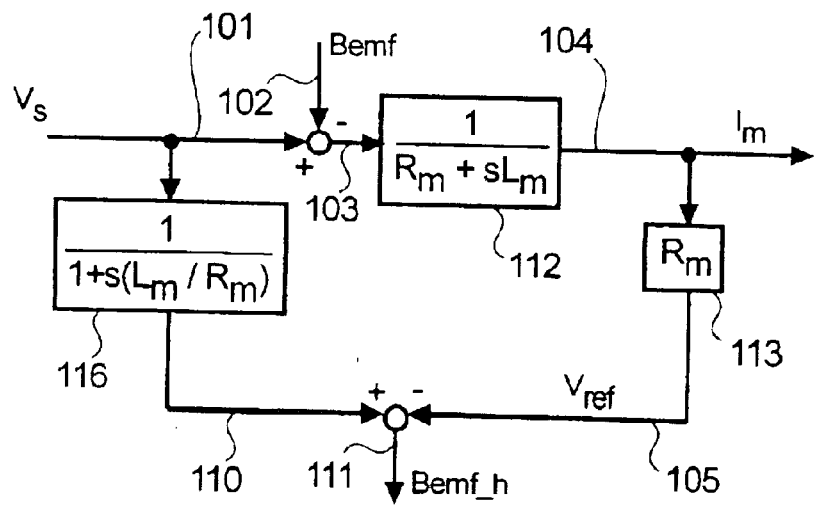
FIG. 11 is a block diagram showing the measurement principles for a back electromotive force sensor according to the present invention.

In contrast to this, the sensor of the present invention solves the above-mentioned problem. In other words, as shown in the block diagram of FIG. 11, the back electromotive force sensor of the present invention can be configured as a back electromotive force sensor that is equivalent to when the time constant Tm of the low pass filter of block 115 in FIG. 10 equals Lm/Rm, but without the differential element.

$$\begin{aligned}
\text{Bemf\_h} &= \frac{1}{1+\frac{L_m}{R_m}s} \cdot V_s - R_m \cdot I_m \qquad \text{Equation (5)}\\
&= \frac{1}{1+\frac{L_m}{R_m}s} \cdot V_s - \frac{R_m}{R_m+sL_m} \cdot (V_s - Bemf)\\
&= \frac{1}{1+\frac{L_m}{R_m}s} \cdot V_s - \frac{1}{1+\frac{L_m}{R_m}s} \cdot (V_s - Bemf)\\
&= \frac{1}{1+\frac{L_m}{R_m}s} \cdot Bemf
\end{aligned}$$

In other words, the block diagram shows that Bemf_h is first expressed by that part of Equation 5 shown by the first equal sign. This equation is then expanded and the equation expressed after the second equal sign shows that this block diagram, that is the value of Bemf_h detected by the back electromotive force sensor of the present invention, is equal to the value when Tm=Lm/Rm in the back electromotive force sensor of FIG. 10.

Equation 2 is obtained by making this theoretical equation correspond to FIG. 1, that shows a circuit diagram of the present invention.

Figure 3:
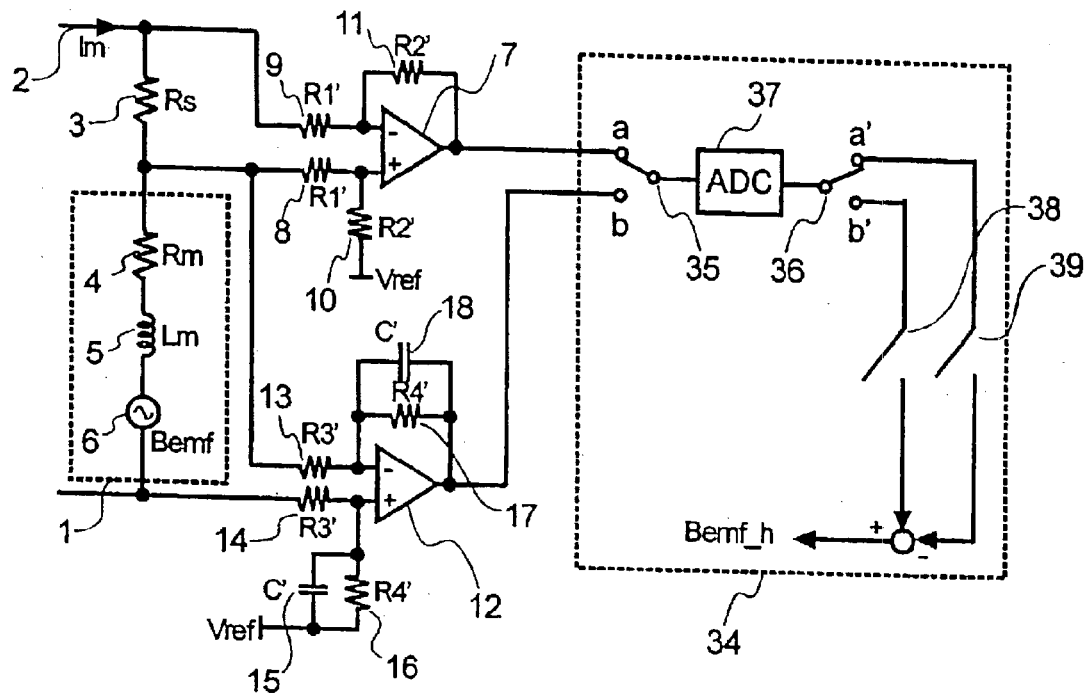
FIG. 3 is a schematic circuit diagram of a second embodiment of a back electromotive force sensor according to the present invention.

FIG. 3 shows a second embodiment of a back electromotive force sensor according to the present invention. In this example, the circuit computations carried out in the first aspect of the embodiment using operational amplifier 19 are carried out as numeric computations within a microcomputer. Below, the elements from which this second aspect of the embodiment are configured will be explained.

In FIG. 3, elements that are also found in FIG. 1 are identified with the same symbols. As in the first embodiment, primary low pass filters, with a gain AI'=R4'/R3' and a filter time constant Tm=C'×R4', each comprising an operational amplifier 12. resistors 13, 14, 16, and 17, and capacitors 15 and 18, are connected across both ends of the VCM coil 2. These low pass filters are an example of the first circuit means used in accordance with the present invention. Gain AI' and reference voltage Vref are selected so that they do not exceed the input range of the AD converter 37 in the microcomputer 34 even when the maximum voltage that can be applied to the VCM coil 2 is applied. As in the first embodiment, C' and R4' are selected for the filter time constant Tm so that Tm=Lm/Rm.

Coefficient amplifiers, each comprising an operational amplifier 7 and resistors 8, 9, 10, and 11, are connected across both ends of the current sensing resistor 3. These coefficient amplifiers are examples of the second circuit means in accordance with the present invention. The gain A2' for these coefficient amplifiers equals R2'/R3'. The resistances R2' and R3' are selected so that A2'=AI'×Rm/Rs. The outputs of operational amplifiers 7 and 12 are encrypted by an AD converter 37 in the microcomputer 34 using a switch 35, and they are sampled using switch 36 and samplers 38 and 39. Switches 35 and 36 and samplers 38 and 39 are interlocked. When the output of operational amplifier 7 is sampled, switches 35 and 36 are connected to sides a and a', respectively, and sampler 39 starts. When the output of operational amplifier 12 is sampled, switches 35 and 36 are connected to sides b and b1, respectively, and sampler 38 starts. The sampled outputs of operational amplifiers 7 and 12 are subtracted within the microcomputer 34, which is the computation means, to obtain the back electromotive force signal Bemf_h.

Figure 4:
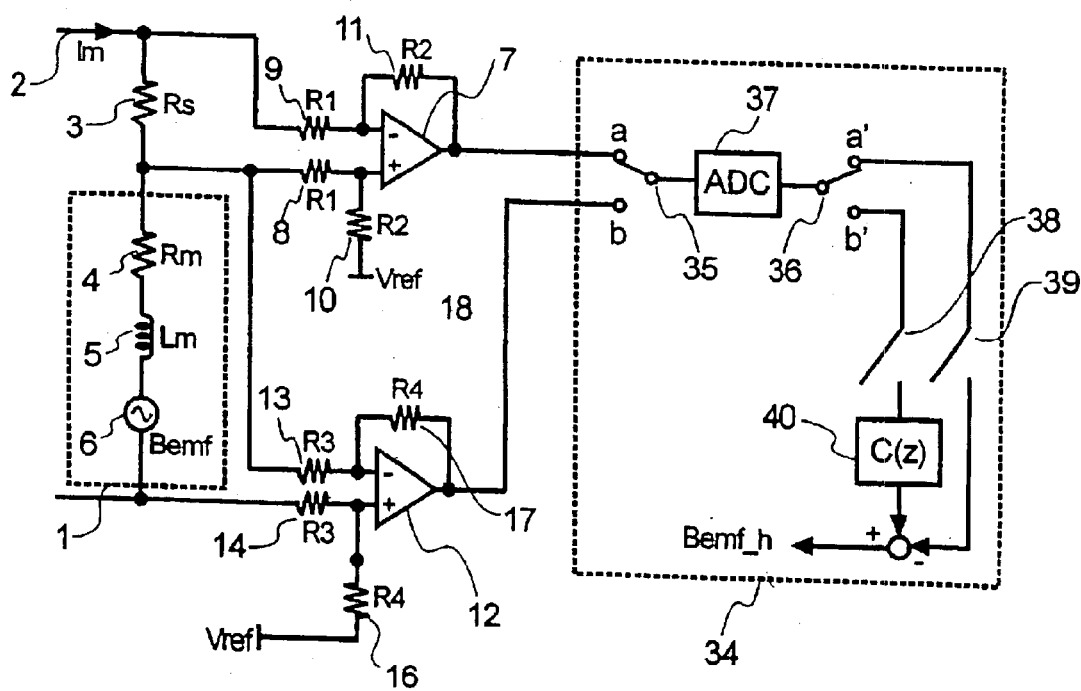
FIG. 4 is a schematic circuit diagram of a third embodiment of a back electromotive force sensor according to the present invention.

FIG. 4 shows a third embodiment of a back electromotive force sensor according to the present invention. In this example, the band-limiting calculations for the terminal voltage of the VCM coil 2, made using operational amplifier 12 in the second embodiment, are made using a digital filter in a microcomputer. In this embodiment, the first circuit means of the present invention comprises an operational amplifier 12, resistors 13, 14, 16, and 17, and a digital filter 40 in a microcomputer. The second circuit means is the same as in the second embodiment shown in FIG. 3 above.

The only difference in the circuit including the operational amplifier 12 is that there are no capacitors 15 and 18 connected to the operational amplifier 12. The gain, that is the values of resistors 8 through 11 and resistors 13, 14, 16, and 17, is the same as in the second embodiment. Using the same operations as explained with reference to the second embodiment, switches 35 and 36, AD converter 37, and samplers 38 and 39 utilize and encrypt the outputs of operational amplifiers 7 and 12. After the output of operational amplifier 12 is sampled, the band is limited by the digital filter 40. The sampled value of the operational amplifier 7 output is subtracted in the computation means, that is the microcomputer 34, to obtain the back electromotive force signal Bemf_h.

Figure 5:
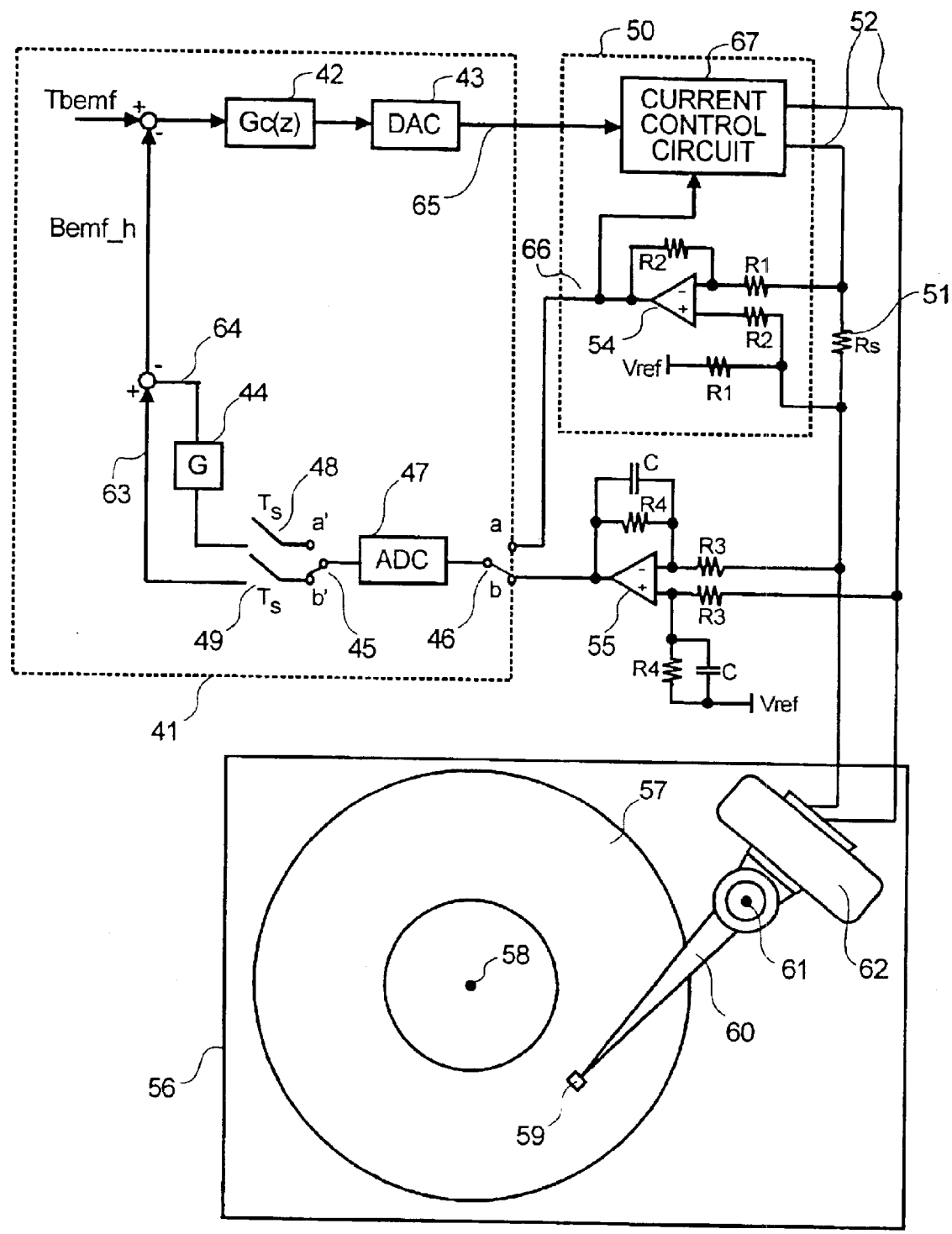
FIG. 5 is a schematic diagram of an embodiment of a magnetic disk drive that uses a back electromotive force sensing circuit according to the present invention.

FIG. 5 shows an embodiment of a magnetic disk drive that implements speed control using the back electromotive force sensor circuit according to the present invention. In the figure, a magnetic disk 57 stores data. The disk is controlled so that it is rotated by a spin idle motor, not shown, at a constant speed around disk center 58. A magnetic head 59 that writes and reads data to and from the magnetic disk 57 is supported by an actuator arm and suspension 60. A driving force, that is produced by the VCM 62, rotates the magnetic head 59 around the actuator rotation center 61 so that it can move to any desired data track, not shown. The above elements are accommodated and sealed in housing 56. The VCM driver 50 controls the VCM 62 via signal line 52. The circuit of operational amplifier 55 is a low pass filter circuit for band-limiting the terminal voltage of the VCM 62. This low pass filter is equivalent to the first circuit means of the present invention.

The gain and reference voltage Vref for this low pass filter are chosen so that they do not exceed the input range of the AD converter 47 in the microcomputer 41 even when the maximum voltage that can be applied to the VCM 62 is applied. The output of the operational amplifier 55 is encrypted by AD converter 47 after switches 45 and 46 are turned to sides b' and b, respectively. This output is then utilized by the sampler 49 as a number in the microcomputer 41, which is the computation means, to become signal 63. The VCM driver 50 detects the current flowing in the VCM 62 using the current sensing resistor 51. The VCM driver 50 has an operational amplifier circuit 54 that outputs the current sensing signal 66. It also has a current control circuit 67 that compares the current command value 65 and the current sensing signal 66 and controls the current. The current sensing signal 66 is encrypted by AD converter 47 after switches 45 and 46 are turned to sides a' and a, respectively. The encrypted signal is then utilized in the microcomputer 41 by the sampler 48.

The utilized value is multiplied by G, the constant gain 44, to become signal 64.

Thus, the back electromotive force signal Bemf_h is calculated through differential calculation of signals 63 and 64 that are read as signals in the microcomputer 41. The difference between the target back electromotive force Tbemf and the back electromotive force signal Bemf_h is calculated, and the operational amount calculated from this difference using the digital compensator 42 is then sent to the DA converter 43. The current command value 65, which is the output of the DA converter 43, is converted into a current by the VCM coil current control circuit 67 in the VCM driver 50 and drives the VCM 62.

In the above-described configuration, if the target back electromotive force Tbemf=0, control can be implemented by applying a brake to the actuator without using the position signal. If Tbemf=0, speed control that is the same as the speed control used for loading and unloading operations in a load-unload type magnetic disk drive can be implemented. The signal quality is higher than in conventional back electromotive force sensors. That is, by using a back electromotive signal, the detection thereof being unaffected by fast changes in current under a fast control sampling cycle or by problems associated with transient responses caused by the above differential item, the sampling cycle of the speed control system can be reduced, and a quality speed control system in which the control band can be improved is obtained.

The circuit used in the above-described embodiment is provided as an IC chip. Note that it is preferable that the resistor that makes un the first circuit means and prescribes the gain, the capacitor that prescribes the time constant of this filter, and the resistor that prescribes the gain of the coefficient amplifier that makes up the second circuit means and computation means, be placed outside the IC chip to ensure latitude in the adjustment of gain and the time constant.

Figure 2:
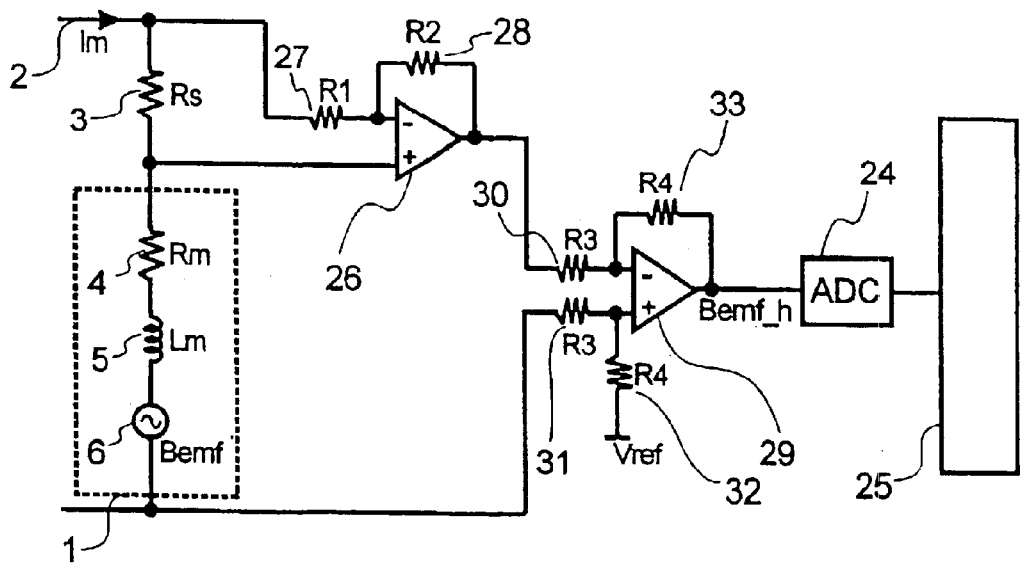
FIG. 2 is a schematic circuit diagram which shows an aspect of a conventional back electromotive force sensor.
Figure 6:
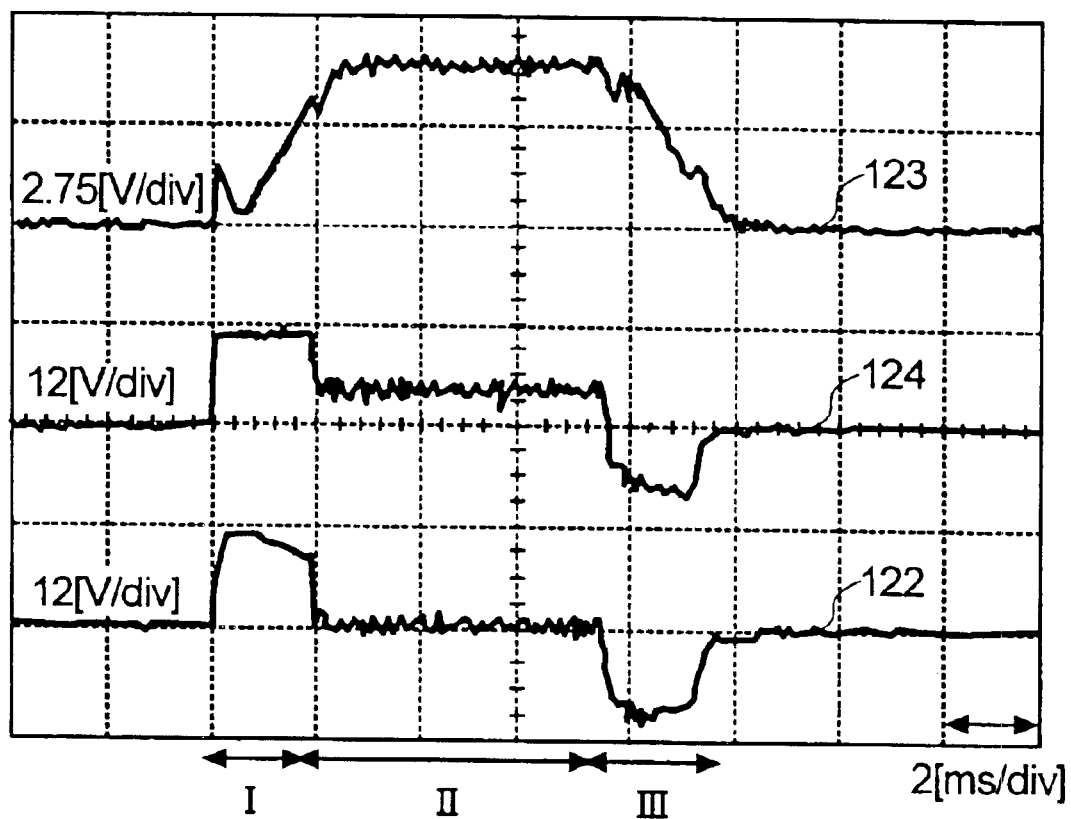
FIG. 6 is a waveform diagram of an output signal detected using a back electromotive force sensing circuit according to the present invention.
Figure 7:
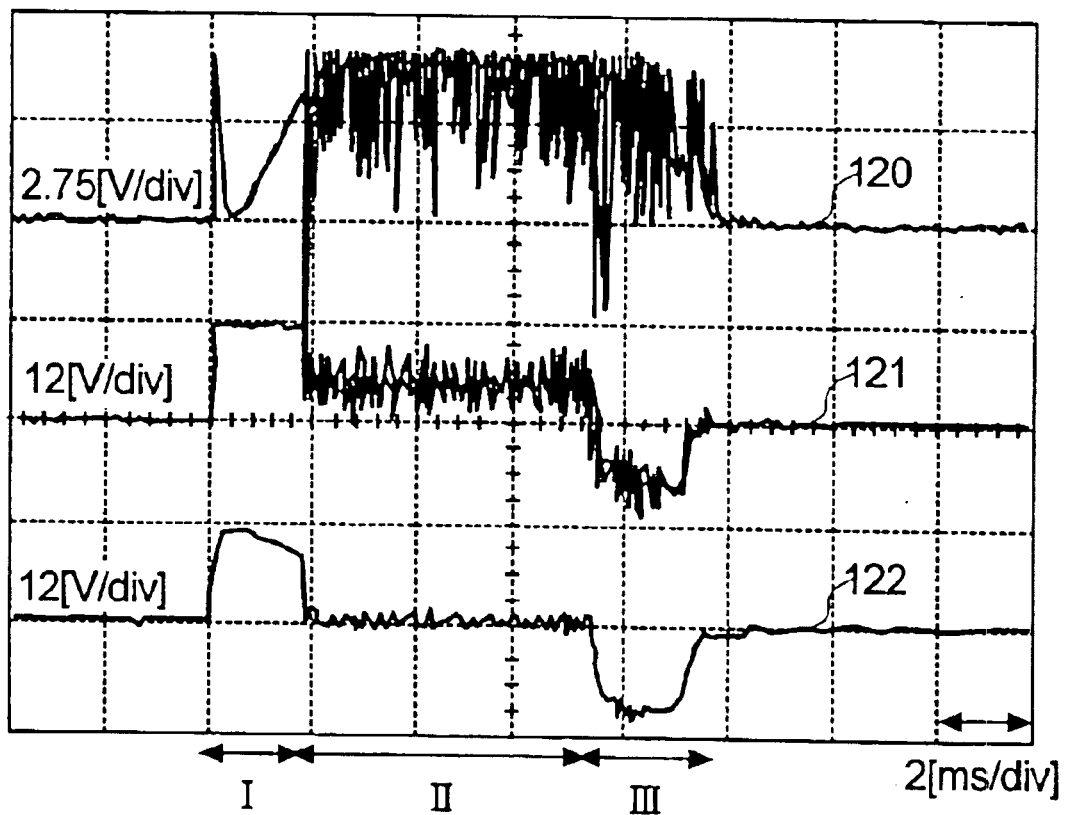
FIG. 7 is a waveform diagram of an output signal detected using a back electromotive circuit of the present invention in which a band-limiting circuit has been excluded from the first circuit.
Figure 8:
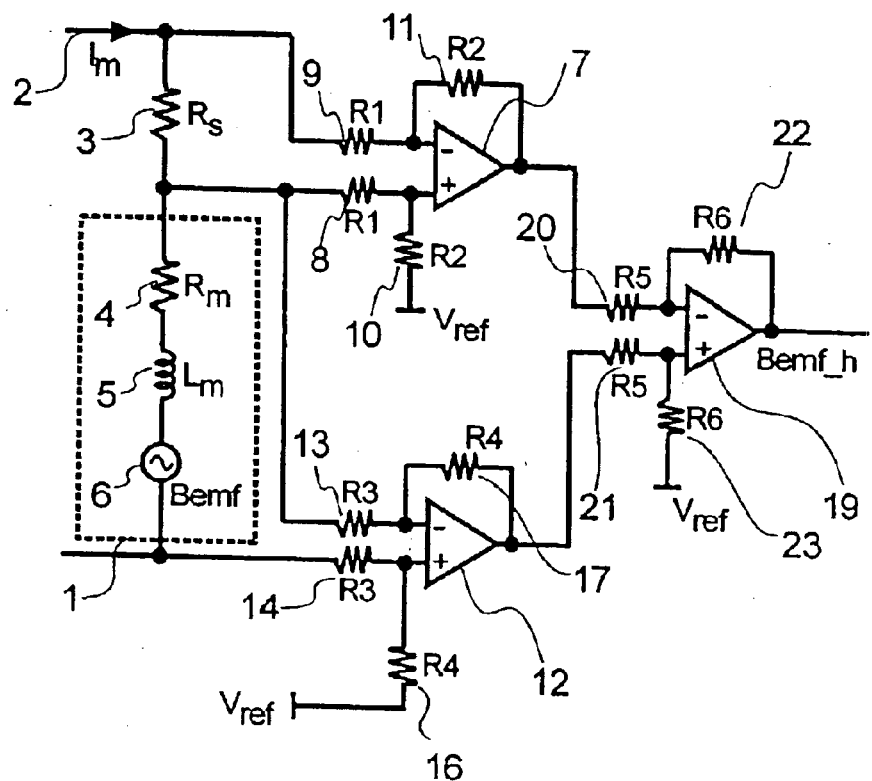
FIG. 8 is a schematic circuit diagram of a back electromotive force sensing circuit according to the present invention in which a band-limiting circuit has been excluded from the first circuit.

To further clarify the effect of the present invention, FIGS. 6 and 7 respectively show the response waveforms of the back electromotive force signal obtained when the circuit of the present invention (FIG. 1) and a back electromotive force sensor, in which the band-limiting means of the first circuit means has been removed from the circuit of the present invention (FIG. 8), are applied in a magnetic disk drive. FIG. 8 shows the circuit of FIG. 1 from which capacitors 15 and 18 have been removed. This operates in the same way as the conventional back electromotive sensor shown in FIG. 2. The control sampling cycle in the magnetic disk drive used in this example is approximately 50 $\mu$s. Both FIGS. 6 and 7 show response waveforms during a seek operation. The VCM actuator is accelerating in area 1, running at a constant velocity in area II, and decelerating in area III. The back electromotive force is proportional to speed, and so, if the back electromotive force is sensed correctly in this operation, the waveform will be in the shape of a trapezoid.

FIG. 6 is a response waveform for the back electromotive force of the present invention. Waveform 124 shows the VCM terminal voltage signal band limited by the first circuit means. Waveform 122 shows the output of the second circuit means, that is, the resistor voltage drop signal for the VCM coil. The back electromotive force sensing signal 123, that is, the difference between waveform 124 and waveform 122, displays a waveform that is basically in the shape of a trapezoid. This shows that a stable back electromotive force that is unaffected by fast changes in current in a control sampling cycle that is as fast as about 50 $\mu$s has been detected.

FIG. 7 is the response waveform for a back electromotive force sensor in which the band limiting means has been removed from the first circuit according to the present invention. Wave form 121 shows a VCM terminal signal that is not band limited. As in FIG. 6, waveform 122 shows the resistor voltage drop signal for the VCM coil. A transient response caused by the differential item in the VCM current is very obvious in the back electromotive force signal 120, which is the difference between waveform 121 and waveform 122. This shows that it is difficult to measure a stable back electromotive force in the associated short control cycle.

The above-mentioned comparison shows that the circuit of the present invention can implement the fast control required to enable speed control of the magnetic head of a magnetic disk drive.

Preferable aspects of the embodiment of the present invention have been discussed above with reference to the drawings. These aspects of the embodiment are merely examples of means by which the present invention is enabled and do not limit the general applicability of the present invention.

The present invention allows detection of a back electromotive force produced when a VCM actuator is driven, unaffected by fast changes in current in fast control sampling cycles. This enables the configuration of fast and high-band fast control systems.

What is claimed is:

1. A magnetic disk drive that drives and positions an actuator using a voice coil motor, comprises:

a current sensing resistor connected in series to a terminal on a current input side of said voice coil motor;

a first operational amplifier in which a reverse input terminal is connected to a terminal on the current input side of said voice coil motor via a first resistor, a non-reverse input terminal is connected to a terminal on a current output side of said voice coil motor via a second resistor, said non-reverse input terminal is connected via a third resistor and a first capacitor which are arranged in parallel to a reference voltage, and a reverse input terminal and output terminal are connected in parallel to a fourth resistor and a second capacitor;

a second operation amplifier in which a reverse input terminal is connected via a fifth resistor to a terminal on the current input side of said current sensing resistor, a non-reverse input terminal is connected via a sixth resistor to the current output side of said current sensing resistor, said non-reverse input terminal is connected via a seventh resistor to a reference voltage, and a reverse in input terminal and output terminal are connected by an eighth resistor; and a third operational amplifier in which a reverse input terminal is connected via a ninth resistor to an output terminal of said second operational amplifier, non-reverse input terminal is connected via a tenth resistor to output terminal of said first operational amplifier and via an eleventh resistor to a reference voltage, and a reverse input terminal and output terminal are connected via a twelfth resistor.

2. The magnetic disk drive according to claim 1, wherein resistance values of said first resistor and said second resistor, said third resistor and said fourth resistor, said fifth resistor and said sixth resistor, said seventh resistor and said eighth resistor, said ninth resistor and said tenth resistor, and said eleventh resistor and said twelfth resistor are respectively equal and wherein capacities of said first and said second capacitors are equal.

3. A magnetic disk drive that drives and positions an actuator with a voice coil motor, comprises:

a current sensing resistor connected in series to a terminal on a current input side of said voice coil motor;

a first operational amplifier in which a reverse input terminal is connected via a first resistor to a terminal on the current input side of said voice coil motor a non-reverse input terminal is connected via a second resistor to the current output side of said voice coil motor, said non-reverse input terminal is connected via third resistor and a first capacitor which are arranged in parallel to a reference voltage, and a reverse input terminal and output temiinal are connected in parallel by a fourth resistor and a second capacitor;

a second operational amplifier in which a reverse input terminal is connected via a fifth resistor to a terminal on a current input side of said current sensing resistor, a non-reverse input terminal is connected via a sixth resistor to a current output side of said current sensing resistor, said non-reverse input terminal is connected via a seventh resistor to a reference voltage, and a reverse input terminal and output terminal are connected by an eighth resistor; and a microcomputer having an AD converter that encrypts the output of said first operational amplifier and said second operational amplifier, a sampler tha samples the encrypted output of said first operational amplifier and said second operational amplifier, and a computation means that subtracts the sampled output of aid first and second operational amplifiers.

4. The magnetic disk drive according to claim 3, wherein resistance values of said first resistor and said second resistor, said third resistor and said fourth resistor, said fifth resistor and said sixth resistor, and said seventh resistor and said eighth resistor, are equal, and wherein capacities of said first capacitor and said second capacitor are respectively equal.

5. The magnetic disk drive according to claim 3, wherein said microcomputer further comprises:

a constant gain unit coupled to said sampler that samples the encrypted output of said second operational amplifier;

a digital compensator inputted with a difference between a target back electromotive force and a subtracted output by said computation means; and a DA converter which converts an output of said digital compensator into a current command value.

* * * * *